(No Model.)
R. M. JONES.
ELECTRIC MOTOR FOR ROTARY DRILLING MACHINES.
No. 502,098.  Patented July 25, 1893.
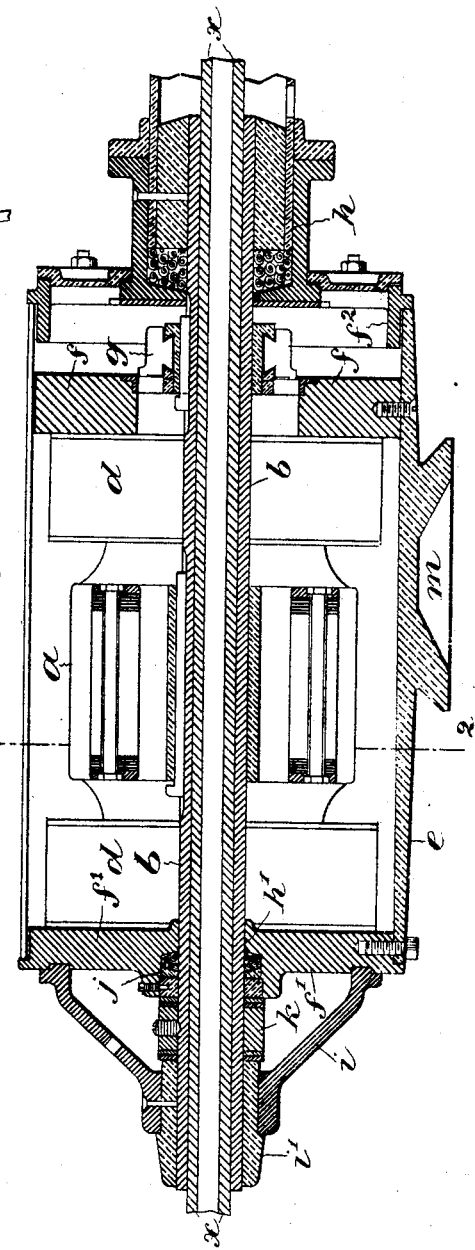
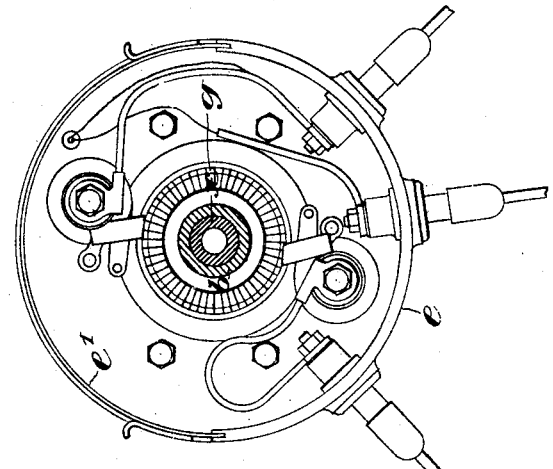
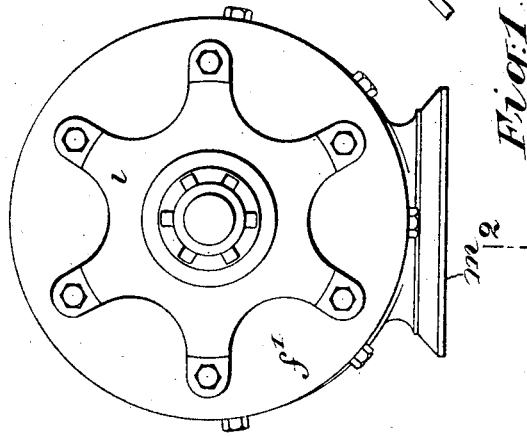
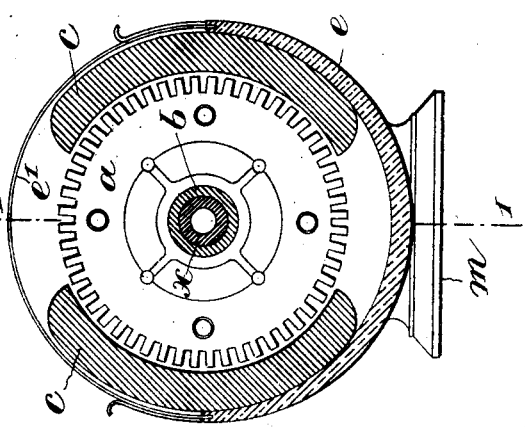
WITNESSES:
Peter A. Ross
Herbert B. Lofom
INVENTOR:
Robert M. Jones
By Henry Connett
Attorney.

United States Patent Office.

ROBERT M. JONES, OF SALT LAKE CITY, UTAH TERRITORY.

ELECTRIC MOTOR FOR ROTARY DRILLING-MACHINES.

SPECIFICATION forming part of Letters Patent No. 502,098, dated July 25, 1893.

Application filed December 22, 1892. Serial No. 456,104. (No model.)

*To all whom it may concern:*

Be it known that I, ROBERT M. JONES, a citizen of the United States, and a resident of the city and county of Salt Lake, in the Territory of Utah, have invented certain new and useful Improvements in Electric Motors for Rotary Drilling-Machines, of which the following is a specification.

My invention relates to the adaptation of an electric motor to a drilling machine, wherein the drill-shaft passes through the hollow or tubular armature shaft of the motor and rotates with the armature; and the object of the invention is, in part, to tightly incase the motor so as to protect it from moisture or dampness and yet provide ready access to it for manipulation and repairs, in part to arrange the essential elements of the motor within the frame and casing in such a compact manner as to best adapt it for the purpose intended, and in part to provide the motor casing with means for conveniently securing it to the ordinary mining column or standard.

The invention will be fully described hereinafter and its novel features carefully defined in the claims.

In the accompanying drawings—Figure 1 is a longitudinal, axial section of the motor in the plane of the line 1, 1, in Fig. 2. Fig. 2 is a transverse section of the same on the line 2, 2, in Fig. 1. Fig. 3 is an elevation of the end of the motor at the left as seen in Fig. 1. Fig. 4 is a transverse section through the commutator showing the brush holders and electrical connections.

The motor herein shown is a two-pole machine, but it may be multipolar. The armature, $a$, is of the Gramme ring type with the outer surface of the core slotted to receive the windings, as indicated in Fig. 2; and the armature shaft, $b$, is tubular to receive the drill shaft $x$. The pole pieces $c, c$, oppositely arranged, have the form of parts of cylinders, and each is extended at opposite ends of the armature where they form magnetic cores to receive the windings of the field-magnets $d$. The armature, pole pieces and field magnets are thus aligned and concentric with the armature shaft, and have exteriorly, when assembled, a cylindrical form.

The motor is mounted in a closely fitting semi-cylindrical casing, $e$, of non-magnetic conducting metal, which is rigidly bolted or otherwise secured to two circular, metal keepers, $f$ and $f'$, to the inner faces of which are bolted the respective field magnets $d$. The casing $e$ extends beyond the keeper $f$,—at the right in Fig. 1,—and is bolted to a head, $f^2$, the keeper $f'$ forming the other head of the casing. The casing $e$ is fixed and forms only one-half of the cylindrical inclosure, the other half being formed by a removable semi-cylindrical cover, $e'$, of non-magnetic conducting metal. This cover may be held in place by any suitable kind of fastenings, and so as to be readily removed for making motor repairs. The keeper $f$ has in it a comparatively large central aperture through which the terminals of the armature windings are led to the commutator $g$, situated next to the head $f^2$. Fig. 4 shows the manner of arranging the commutator brushes and electrical connections, which may be of the usual kind and therefore sufficiently illustrated in this view.

The armature shaft has packed bearings in the heads $f'$ and $f^2$ of the casing. The upper bearing, $h$, is in the head $f^2$, and the lower bearing $h'$ is in the head or keeper $f'$, where stuffing boxes are provided to prevent leakage of oil or moisture upon the motor. To the lower head $f'$ is bolted a cone-shaped bracket, $i$, which carries an outer bearing, $i'$, for the armature shaft; and between this bearing and the gland, $j$, is a collar, $k$, set on the armature shaft to prevent endwise movement of the latter. Between the ends of this collar and the adjacent parts, washers are placed to reduce the friction and take the wear.

On the casing $e$ is a raised boss or enlargement, $m$, for the purpose of securing the motor to an ordinary mining column or tripod; this boss is cast integrally with the casing.

By the construction and arrangement of the motor shown, with all of its parts aligned and concentric with the armature shaft, and circular exteriorly, I am enabled to mount the motor firmly in an inclosing casing or housing in a compact form and in such a manner that it may be securely protected against moisture, oil, &c., as stated.

Having thus described my invention, I claim—

1. The combination with an electric motor adapted for operating a rotary drill, of a semi-cylindrical motor-casing of non-magnetic metal provided with a boss or flange for securing the casing to a mining column or tripod, the motor being securely fixed in said casing and having a tubular armature shaft with bearings in the heads of said casing.

2. The combination with the semi-cylindrical casing of non-magnetic metal, and the two circular keepers of metal fixed in said casing, of the electric motor mounted in said casing between said keepers, said motor comprising the tubular armature shaft, the armature fixed thereon, the commutator and brushes, the pole-pieces, the opposite, extended ends of which form cores of the field magnet coils, and the said coils, the field magnets being secured to and being in electrical contact with the respective adjacent keepers of the casing and the several elements of the motor arranged concentrically within said casing, substantially as set forth.

3. An electric motor, comprising an armature and its shaft, pole-pieces, c, having circular exterior surfaces concentric with the armature shaft and extended parallel with said shaft to form cores for the field magnets, the coils of the field magnets, and the commutator and brushes, in combination with an inclosing casing of cylindrical form made of non-magnetic metal, the field magnets being secured to the ends of said casing, as set forth.

4. The combination with an inclosing cylindrical casing for an electric motor, having packed bearings in its ends for the tubular armature shaft and made of non-magnetic metal, of the motor mounted in said casing and fixed in place by having its field magnets secured to circular keepers which form part of the inclosure, substantially as set forth.

5. The combination with the electric motor provided with a tubular armature shaft and having a cylindrical form exteriorly of a cylindrical, moisture-proof housing of non-magnetic metal, in which the armature shaft has packed bearings, the inclosing housing having a removable section to afford access to the motor, as set forth.

In witness whereof I have hereunto signed my name in the presence of two subscribing witnesses.

ROBERT M. JONES.

Witnesses:
B. J. McCONVILLE,
CHARLES SPILMAN.